(12) United States Patent
Takahashi

(10) Patent No.: US 10,902,301 B2
(45) Date of Patent: Jan. 26, 2021

(54) INFORMATION PROCESSING DEVICE AND NON-TRANSITORY COMPUTER READABLE MEDIUM STORING INFORMATION PROCESSING PROGRAM

(71) Applicant: FUJI XEROX CO., LTD., Tokyo (JP)

(72) Inventor: Aoi Takahashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 123 days.

(21) Appl. No.: 16/100,517

(22) Filed: Aug. 10, 2018

(65) Prior Publication Data

US 2019/0251400 A1    Aug. 15, 2019

(30) Foreign Application Priority Data

Feb. 14, 2018 (JP) .................................. 2018-023971

(51) Int. Cl.
| | |
|---|---|
| *G06K 9/62* | (2006.01) |
| *G06K 9/00* | (2006.01) |
| *G10L 15/20* | (2006.01) |
| *G06F 3/0481* | (2013.01) |
| *G06F 16/901* | (2019.01) |
| *G06F 16/9038* | (2019.01) |
| *G10L 25/51* | (2013.01) |
| *G06F 40/268* | (2020.01) |
| *G10L 15/08* | (2006.01) |

(52) U.S. Cl.
CPC ......... *G06K 9/6288* (2013.01); *G06F 3/0481* (2013.01); *G06F 16/9024* (2019.01); *G06F 16/9038* (2019.01); *G06F 40/268* (2020.01); *G06K 9/00302* (2013.01); *G10L 15/20* (2013.01); *G10L 25/51* (2013.01); *G10L 2015/085* (2013.01)

(58) Field of Classification Search
None
See application file for complete search history.

(56) References Cited

U.S. PATENT DOCUMENTS

| | | | | |
|---|---|---|---|---|
| 9,294,474 | B1 * | 3/2016 | Alikhani | ................. G06F 21/31 |
| 9,983,760 | B2 | 5/2018 | Min | |
| 10,225,608 | B2 * | 3/2019 | Shigeta | ............. H04N 21/4312 |
| 2011/0170777 | A1 * | 7/2011 | Inagaki | .................... G06F 16/35 |
| | | | | 382/177 |
| 2012/0246162 | A1 * | 9/2012 | Yamaguchi | ........... G06F 40/247 |
| | | | | 707/737 |

FOREIGN PATENT DOCUMENTS

| | | |
|---|---|---|
| JP | 2014-106968 A | 6/2014 |
| JP | 2017-112545 A | 6/2017 |

* cited by examiner

*Primary Examiner* — Leon Viet Q Nguyen
(74) *Attorney, Agent, or Firm* — Oliff PLC

(57) ABSTRACT

An information processing device includes a display controller that displays a term expression expressing a term which appears in target data, on a display in a display mode based on a level of liveliness of the target data when the term appears.

13 Claims, 11 Drawing Sheets

FIG. 2

| DATE/TIME | SEA | MOUNTAIN | RIVER | ... |
|---|---|---|---|---|
| 2017/10/12 14:14 | 10 | 2 | 5 | ... |
| 2017/10/12 14:15 | 10 | 3 | 4 | ... |
| 2017/10/12 14:16 | 0 | 5 | 1 | ... |
| ... | ... | ... | ... | ... |

FIG. 3

| DATE/TIME | LIVELINESS LEVEL | FACIAL EXPRESSION | SOUND VOLUME | NUMBER OF MEMBERS WHO HAVE EXPRESSED OPINION | TEMPERATURE | POSITIVE OPINION |
|---|---|---|---|---|---|---|
| 2017/10/12 14:14 | 36 | 5 | 5 | 8 | 2 | 16 |
| 2017/10/12 14:15 | 47 | 10 | 7 | 10 | 5 | 15 |
| 2017/10/12 14:16 | 26 | 2 | 4 | 8 | 2 | 10 |
| ... | ... | ... | ... | ... | ... | ... |

FIG. 8

|   | | SEA | MOUNTAIN | RIVER | GRASS | WATERFALL |
|---|---|---|---|---|---|---|
| 14a → | 2017/10/12 | 20 | 10 | 10 | 0 | 0 |
| 14b → | 2017/10/17 | 20 | 8 | 10 | 0 | 0 |
| 14c → | 2017/10/22 | 20 | 10 | 10 | 5 | 5 |
| | ... | ... | ... | ... | ... | ... |

US 10,902,301 B2

INFORMATION PROCESSING DEVICE AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2018-023971 filed on Feb. 14, 2018.

BACKGROUND

Technical Field

The present invention relates to an information processing device and a non-transitory computer readable medium storing an information processing program.

SUMMARY

According to an aspect of the invention, there is provided an information processing device including a display controller that displays a term expression expressing a term which appears in target data, on a display in a display mode based on a level of liveliness of the target data when the term appears.

BRIEF DESCRIPTION OF THE DRAWINGS

Exemplary embodiment of the present invention will be described in detail based on the following figures, wherein:

FIG. 2 is a table illustrating an example of an aggregate result of the number of appearances of each term which appears in target data;

FIG. 3 is a table illustrating an example of an aggregate result of parameters related to target data for level of liveliness calculation;

FIG. 8 is a table illustrating an example of the number of appearances of each term;

DETAILED DESCRIPTION

Figure 1:
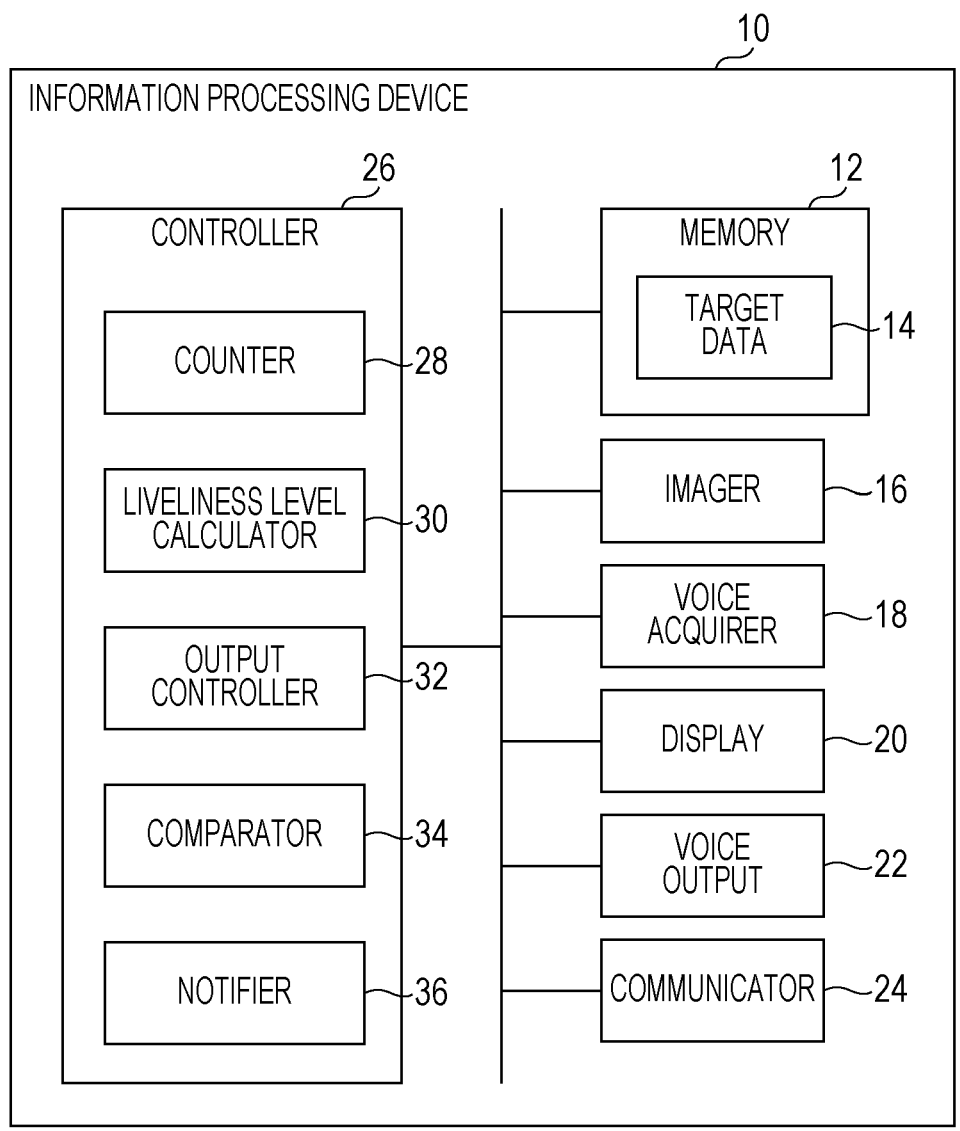
FIG. 1 is a schematic configuration diagram of an information processing device according to this exemplary embodiment.

FIG. 1 is a schematic configuration diagram of an information processing device 10 according to a first exemplary embodiment. In the exemplary embodiment, the information processing device 10 is a robot installed in a meeting room. However, as long as the later-described functions are implemented, the information processing device 10 may be any type of device. For instance, the information processing device 10 may be a mobile terminal such as a personal computer, a smartphone, or a server.

A memory 12 is configured by, for instance a ROM, a RAM, or a hard disk. The memory 12 stores information processing programs for operating the components of the information processing device 10. In addition, as illustrated in FIG. 1, target data 14 is stored in the memory 12.

The target data 14 is data to be processed by the information processing device 10. In the exemplary embodiment, the target data 14 is meeting data that indicates the contents of a meeting, and more specifically, the target data 14 is a video that captures the situation of a meeting. However, the target data 14 is not limited to meeting data, and may be a computerized document such as a web page or an electronic document, other video data, or sound data. The target data 14 may be obtained from a device other than the information processing device 10 via the later-described communicator 24, or may be generated by the information processing device 10.

An imager 16 includes, for instance, a camera. The imager 16 captures an image of the surroundings of the information processing device 10. Specifically, the imager 16 captures an image of the situation of a meeting, for instance, the faces of the participants of a meeting.

A sound acquirer 18 includes, for instance, a microphone. The sound acquirer 18 is used to acquire the sound in a meeting. Alternatively, the sound acquirer 18 is used to input instructions for the information processing device 10 by voice of a user. Also, the information processing device 10 may include an input interface (not illustrated) including a button or a touch panel as a unit to input an instruction of a user. Also, as the input interface, the information processing device 10 may include a user interface which receives a non-contact operation (gesture) utilizing the imager 16, the sound acquirer 18, or a sensor.

A display 20 includes, for instance, a liquid crystal panel. On the display 20, various screens are displayed, and particularly a processing result of the later-described controller 26 is displayed.

A sound output 22 includes, for instance, a loudspeaker. The sound output 22 is used to output a processing result of the controller 26, particularly notification to a user via sound.

It is to be noted that when the information processing device 10 is a device such as a server, the information processing device 10 may not include any of the imager 16, the sound acquirer 18, the display 20, and the sound output 22. In this case, for instance, a camera corresponding to the imager 16, a microphone corresponding to the sound acquirer 18, a display corresponding to the display 20, and a loudspeaker corresponding to the sound output 22 are installed in a meeting room in a state which allows communication with the information processing device 10. In addition, an image captured by the camera, or sound data obtained by the microphone are transmitted to the information processing device 10, and a screen is displayed on the display, or sound is outputted from the loudspeaker in accordance with an instruction from the information processing device 10.

A communicator 24 includes, for instance, a communication module. The communicator 24 is used to communicate with other devices.

The controller 26 includes, for instance, a CPU or a micro controller. The controller 26 controls the components of the information processing device 10 in accordance with an information processing program stored in the memory 12. As illustrated in FIG. 1, the controller 26 also serves as a counter 28, a liveliness level calculator 30, an output controller 32, a comparator 34 and a notifier 36.

The counter 28 counts the number of appearances of a term which appears in the target data 14. When multiple terms appear in the target data 14, the counter 28 counts the number of appearances of each of the multiple terms. Here, the "term" is a concept that includes a word that is the minimum unit of a sentence structure, and an expression or a phrase that is made up of multiple words.

Specifically, the counter 28 counts the number of appearances of each term which appears in the target data 14 every predetermined unit time. In the exemplary embodiment, the unit time is set to 1 minute, and the counter 28 counts the number of appearances of each term every minute. Needless to say, the unit time may be set to another time. FIG. 2 illustrates an example of the number of appearances of each term in the target data 14, counted by the counter 28. For instance, in the example of FIG. 2, the term "sea" appears 10 times, the term "mountain" appears twice, and the term "river" appears 5 times during the period from 14:14 to 14:15. The number of appearances of each term of the target data 14 per unit time as illustrated in FIG. 2 is stored in the memory 12.

In the target data 14, the same term may be used in different meanings. Therefore, the counter 28 analyzes the meaning of each term by performing natural language processing including morphological analysis, syntax analysis, semantic analysis, and context analysis on text data (for instance, data in which the voice contained in the target data 14 is texted) extracted from the target data 14, and may count the number of appearances of the same terms separately when used in different meanings.

The liveliness level calculator 30 calculates a level of liveliness in the contents of the target data 14. Specifically, the liveliness level calculator 30 calculates a level of liveliness based on one or more parameters of the contents of the target data 14. In the exemplary embodiment, since the target data 14 is meeting data, the following parameters are used as the parameters for level of liveliness calculation: a facial expression parameter based on the facial expressions of meeting participants, a sound volume parameter based on the sound volume of a meeting room, an utterance headcount parameter based on the number of meeting participants who have uttered, a temperature parameter based on the temperature of a meeting room, and a positive utterance parameter based on the number of utterances of a positive term or an affirmative reply.

The liveliness level calculator 30 represents the facial expression of each meeting participant as a facial expression parameter using a numerical value. In the exemplary embodiment, a facial expression showing positive emotions such as joy is represented by one of positive values 1 to 10, and a facial expression showing negative emotions such as anger or sadness is represented by one of negative values −1 to −10. The value 0 represents a facial expression (such as an impassive facial expression) showing neither positive nor negative emotion.

The facial expression parameter can be calculated based on the face image of each meeting participant, captured by the imager 16. Specifically, let a learning machine learn using pairs of a human face image and an emotion shown by the face image as learning data, and the face image, captured by the imager 16, of each meeting participant is inputted to the learning machine which has sufficiently learned, thereby estimating the emotion of each meeting participant. In addition, for the estimated emotion, a larger facial expression parameter is assigned to a higher positive emotion, and a smaller facial expression parameter is assigned to a higher negative emotion.

The liveliness level calculator 30 represents the sound volume of a meeting room acquired by the sound acquirer 18 as a sound volume parameter using a numerical value. Specifically, the sound volume of a meeting room is represented by one of the values 0 to 10. It is to be noted that the sound volume parameter may relatively represent a sound volume during the period from the start of sound volume measurement (for instance, at the start of a meeting) to the end of the sound volume measurement (for instance, at the end of the meeting). This is because there are various factors of sound, such as the number of meeting participants and environmental sound, and relative representation of a sound volume allows more favorable comparison between the sound volumes during a meeting than when a sound volume is expressed by an absolute value.

Basically, a value based on the number of meeting participants who have uttered (utterance headcount) may be used as the utterance headcount parameter. Incidentally, the utterance headcount may be obtained, for instance, by using a known speaker recognition technique based on the sound data acquired by the sound acquirer 18. Alternatively, speakers may be identified in consideration of the image of the situation of a meeting, captured by the imager 16.

However, even when many participants have uttered in a meeting, the meeting may not be lively. For instance, although all participants have a conversation, some of the participants may have a lively conversation about a topic different from the subject of the meeting. In the exemplary embodiment, the liveliness level calculator 30 calculates an utterance headcount parameter by the following Expression 1 in consideration of such a "variation" in utterance.

$$\frac{\text{the number of participants who have uttered}}{\text{the number of participants of meeting} \times \text{the number of groups}} \times 10 \quad \text{Expression 1}$$

In Expression 1, the utterance headcount is the number of participants who have continued to utter for a predetermined time or greater. Each of groups includes multiple meeting participants who have a conversation of the same topic. For instance, when there are a group engaged in a conversation about the subject of a meeting and a group engaged in a conversation about another topic, the number of groups is two. The liveliness level calculator 30 can determine the number of groups based on the situation (such as the orientation of the face) of each meeting participant, captured by the imager 16.

As shown by Expression 1, the utterance headcount parameter is higher for a larger utterance headcount, and the utterance headcount parameter is lower for a smaller utterance headcount.

In the exemplary embodiment, the temperature of a meeting room is used as the temperature parameter under the assumption that the temperature is 0 at the start of a meeting. From the viewpoint that the temperature of a meeting room increases as the meeting becomes more lively, the temperature parameter is added as the parameter for level of liveliness calculation.

As the positive utterance parameter, it is possible to use the sum of the number of utterances of a positive term (such as "Great") and the number of utterances of an affirmative reply (such as "Yes") which have been acquired by the sound acquirer 18.

In the exemplary embodiment, the liveliness level calculator 30 calculates the sum of the above-mentioned parameters as the level of liveliness of the target data 14.

In the exemplary embodiment, since the target data 14 is meeting data, the above-mentioned parameters are measured to calculate the level of liveliness. However, another parameter may be used as a parameter for level of liveliness calculation, and a parameter for level of liveliness calculation may be set as appropriate according to the contents of the target data 14. Although the level of liveliness is defined as the sum of the parameters is in the exemplary embodiment, another method may be adopted for calculation of a level of liveliness based on the parameters.

More specifically, the liveliness level calculator 30 calculates the level of liveliness of the target data 14 every unit time mentioned above. Since the unit time is set to 1 minute in the exemplary embodiment, the liveliness level calculator 30 calculates the level of liveliness of the target data 14 every minute.

There is a possibility that high level of liveliness is calculated when meeting participants have an idle conversation unrelated to the subject of the meeting. For this reason, at the time of idle conversation, the liveliness level calculator 30 may not measure the above-mentioned parameters or may reduce an effect contributing to the level of liveliness. Specifically, keywords indicating the subject of a meeting are registered in advance in the memory 12, and when terms unrelated to the keywords continue to appear, the liveliness level calculator 30 may determine that an idle conversation is ongoing. Alternatively, the number of meeting participants is registered in advance in the memory 12, and before all the meeting participants gather, the liveliness level calculator 30 may determine that an idle conversation is ongoing.

FIG. 3 illustrates an example of the value of each parameter of the target data 14 and the level of liveliness which are calculated by the liveliness level calculator 30.

For instance, in the example of FIG. 3, the facial expression parameter is 5, the sound volume parameter is 5, the utterance headcount parameter is 8, the temperature parameter is 2, and the positive utterance parameter is 16 in the period from 14:14 to 14:15, thus, the level of liveliness as the total of those parameters in the period from 14:14 to 14:15 is calculated to be 36. The level of liveliness during each unit time of the target data 14 as illustrated in FIG. 3 is stored in the memory 12.

Figure 4:
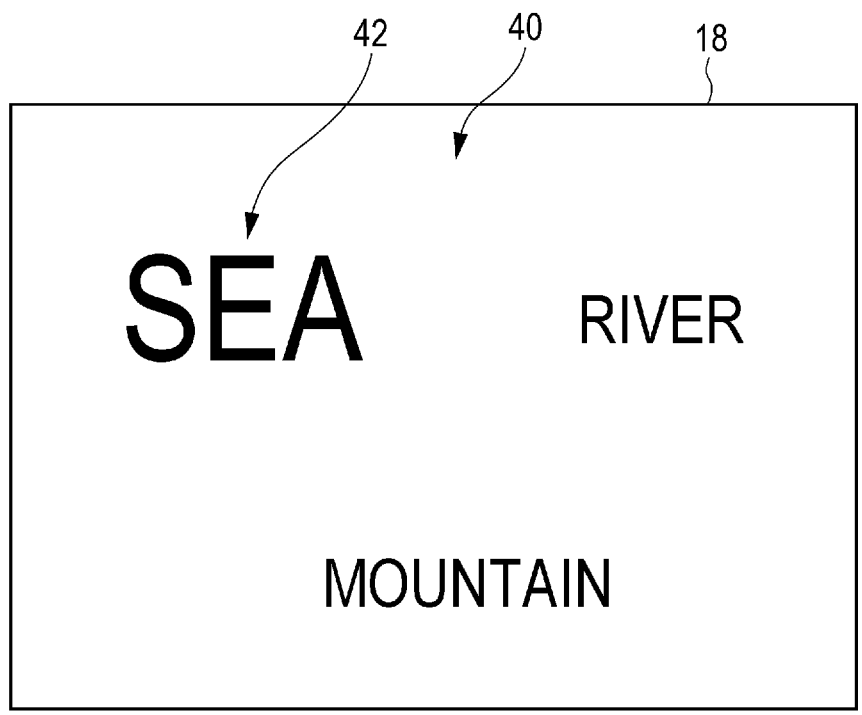
FIG. 4 is a display illustrating a first display example of word cloud according to the exemplary embodiment.

Returning to FIG. 1, the output controller 32 generates and displays a word cloud based on the target data 14. The word cloud is an image in which the terms which appear in the target data 14 are arranged side by side, and is so to speak a term group image. Hereinafter in order to distinguish between a term as a concept and a term as a structure element included in a word cloud, a term as a structure element in a word cloud is referred to as a "term expression". Specifically, the output controller 32 displays a term expression expressing a term in a word cloud in a display mode based on the level of liveliness of the target data 14 when the term in the target data 14 appears. Like this, the output controller 32 serves as a display controller. The output controller 32 may further display the term expression in a display mode based on the number of appearances of the term which appears in the target data 14. FIG. 4 illustrates an example of a word cloud 40 including multiple term expressions 42.

In the exemplary embodiment, the output controller 32 calculates the product of the number of appearances of a term during a unit time and the level of liveliness during the unit time as a unit index value, and calculates the sum of the unit index value determined during each unit time as an index value of the term. The index value of the term is a value that reflects both the number of appearances of the term in the target data 14 and the level of liveliness when the term appears. In addition, a display mode of the term expressions 42 for the term is determined based on the calculated index value. The index value of the term may be calculated by another method as long as the index value reflects both the number of appearances of the term in the target data 14 and the level of liveliness when the term appears.

For instance, it is assumed that the number of appearances of each term is counted by the counter 28 as illustrated in FIG. 2, and the level of liveliness is calculated by the liveliness level calculator 30 as illustrated in FIG. 3. When attention is focused on the term "sea", for one minute after 14:14, the unit index value is the product of the number of appearances "10" and the level of liveliness "36", which is "360". Similarly, the unit index value is calculated for another unit time. In the word cloud 40 targeted for 3 minutes from 14:14 to 14:17, the index value as the sum of the unit index value calculated for each unit time is "850". Therefore, the output controller 32 displays the term expression 42 for "sea" in a display mode according to the index value "850".

Although the product of the number of appearances and the level of liveliness during the unit time is calculated as the unit index value in the above example, the number of appearances and the level of liveliness are multiplied by respective weight coefficients, and the sum of the products may be the unit index value. For instance, the unit index value is calculated by the following Expression:

(unit index value)=$(t-1)$(the number of appearances of term during unit time)+$t$(the level of liveliness during unit time)     (Expression 2).

In Expression 2, t and (t−1) are weight coefficients. According to Expression 2, an index value with the level of liveliness emphasized can be calculated, for instance, by increasing t. Conversely, an index value with the number of appearances emphasized can be calculated by decreasing t.

Also, when a term expression for a term is displayed in a display mode simply based on the level of liveliness of the target data when the term appears, the output controller 32 may use, for instance, an accumulated value of the level of liveliness during a unit time in which the term appears, as the index value of the term.

In the exemplary embodiment, for a greater index value of a term, the output controller 32 displays the term expression 42 for the term in larger size in the word cloud 40. In other words, for a less index value of a term, the output controller 32 displays the term expression 42 for the term in smaller size in the word cloud 40. It is to be noted that as a display mode of the term expression 42 according to an index value, instead of or in addition to setting each term expression 42 to a size according to the index value, the thickness, hue, or density of the term expression 42 may be set according to the index value of the term.

It is to be noted that a display mode of the term expression 42 for each of multiple terms may be determined according to a relative relationship between the index values of the terms included in the target data 14. For instance, even when index values of the term "sea" have the same value, the term expression 42 for "sea" when the index values of other terms are smaller than the index value of the term "sea" may be displayed in a larger size, as compared with the term expression 42 for "sea" when the index values of other terms are larger than the index value of the term "sea".

It is possible to grasp the terms which appear frequently when the level of liveliness increases in the target data 14 by the display mode of each term expression 42 included in the word cloud 40. For instance, in the example of FIG. 4, the term expression 42 "sea" is displayed in relatively large size, thus it can be seen that the term "sea" appears frequently when the level of liveliness increases in the target data 14.

Since the number of appearances is calculated for each term which appears in the target data 14, the number of appearances of each of terms having a similar meaning is counted separately. However, when the number of appearances of each of terms having a similar meaning is counted separately, if a priority term is expressed by multiple similar terms in the target data 14, the number of appearances of each of the similar terms is independently distributed. In this case, even when a concept indicated by similar terms appears frequently at the time of high level of liveliness, the term expression 42 for each of the similar terms is displayed in smaller size in the word cloud 40, a situation may occur in which it is difficult to identify the term expression 42.

Therefore, the output controller 32 may regard multiple terms having a degree of similarity of meaning higher than or equal to a predetermined threshold as a single term collectively. For instance, when the degree of similarity of meaning of "lake" and "pond" is higher than or equal to a predetermined threshold, the index value of "lake" is 300, and the index value of "pond" is also 300, the term expression 42 for one of the "lake" and "pond" may be displayed in a display mode according to the index value 600 which is the sum of both index values. A degree of similarity between terms can be determined based on a thesaurus that is a systematic database in which terms are classified by a superordinate/subordinate relationship, a part/whole relationship, a synonymous relationship, and a quasi-synonymous relationship. The "similarity" in the present description may be directed to not only terms indicating a similar meaning (for instance, "PC" and "machine"), but also terms having a high relevance (for instance, "insect" and "soil").

Also, in the exemplary embodiment, the output controller 32 may display the term expression 42 by a graphic or a photograph in the word cloud 40. For instance, a term having an index value higher than or equal to a threshold among multiple terms appearing in the target data 14 may be represented by a photograph. For instance, for the term "summer", an image (photograph) displayed at the top when image search for the term "summer" is performed may be displayed as the term expression 42. Needless to say, even in this case, a display mode of the photograph as the term expression 42 is determined according to the index value of the term "summer".

When the term expression 42 for each of all terms appearing in the target data 14 is included in the word cloud 40, a term expression 42 for a term which is not completely necessary for the contents of the target data 14 may be included. For instance, there is a situation in which terms such as "Great" and "Maybe" are frequently used in a meeting, and in the situation, the term expression 42 for "Great" or "Maybe" is displayed in a larger size in the word cloud 40. In order to avoid such a situation, in the exemplary embodiment, the output controller 32 refers to comprehensive large-scale text data (which may include SNS text data), the term expression 42 for any term which appears frequently in the text data may be excluded from the word cloud 40.

The output controller 32 may edit the word cloud 40 according to feedback from users. For instance, when an instruction to delete a specific term expression 42 is received from a user via an input interface or the communicator 24, the output controller 32 may delete the term expression 42 from the word cloud 40. Alternatively, when a display mode (such as a size, a color) for a specific term expression 42 is designated by a user, the output controller 32 may change the display mode for the term expression 42 as designated by the user. The instructions from users may be stored in the memory 12, and when a new word cloud 40 is generated, the output controller 32 may generate a word cloud 40 according to an instruction of a user (a specific term expression 42 is not displayed or a display mode of a specific term expression 42 is set as designated by a user) stored in the memory 12.

After a meeting ends, the output controller 32 may generate and display a word cloud 40 afterwards based on the target data 14 including the contents of the entire meeting, or may generate and display a word cloud 40 in real time during a meeting.

In this case, in response to start trigger inputted by a user, the counter 28 starts to count each term which appears in a meeting, every unit time. Similarly, in response to the start trigger, the liveliness level calculator 30 starts to calculate a parameter for liveliness level calculation and a level of liveliness. As a start trigger, for instance, voice such as "Let's start a meeting" spoken by a meeting participant may be used, or a start trigger may be inputted by another method.

The output controller 32 generates and displays the word cloud 40 based on the number of appearance of each term and the level of liveliness up to the present. Each time the unit time elapses, the output controller 32 generates and displays a new word cloud 40 based on the number of appearance of each term and the level of liveliness during each unit time in the past, and the number of appearance of each term and the level of liveliness during a new unit time. In this manner, the display mode of each term expression 42 included in the word cloud 40 dynamically changes every unit time.

When an end trigger is inputted from a user, the counter 28 and the liveliness level calculator 30 stop the processing. The output controller 32 generates and displays the word cloud 40 for the entire meeting. As an end trigger, for instance, voice such as "This ends the meeting" spoken by a meeting participant may be used, or an end trigger may be inputted by another method.

When a term expression 42 included in the word cloud 40 displayed on the display 20 is selected by a user, the output controller 32 may output part of target data 14 corresponding to the selected term expression 42. In the exemplary embodiment, part of target data 14 corresponding to each term expression 42 is determined by the following steps.

Figure 5:
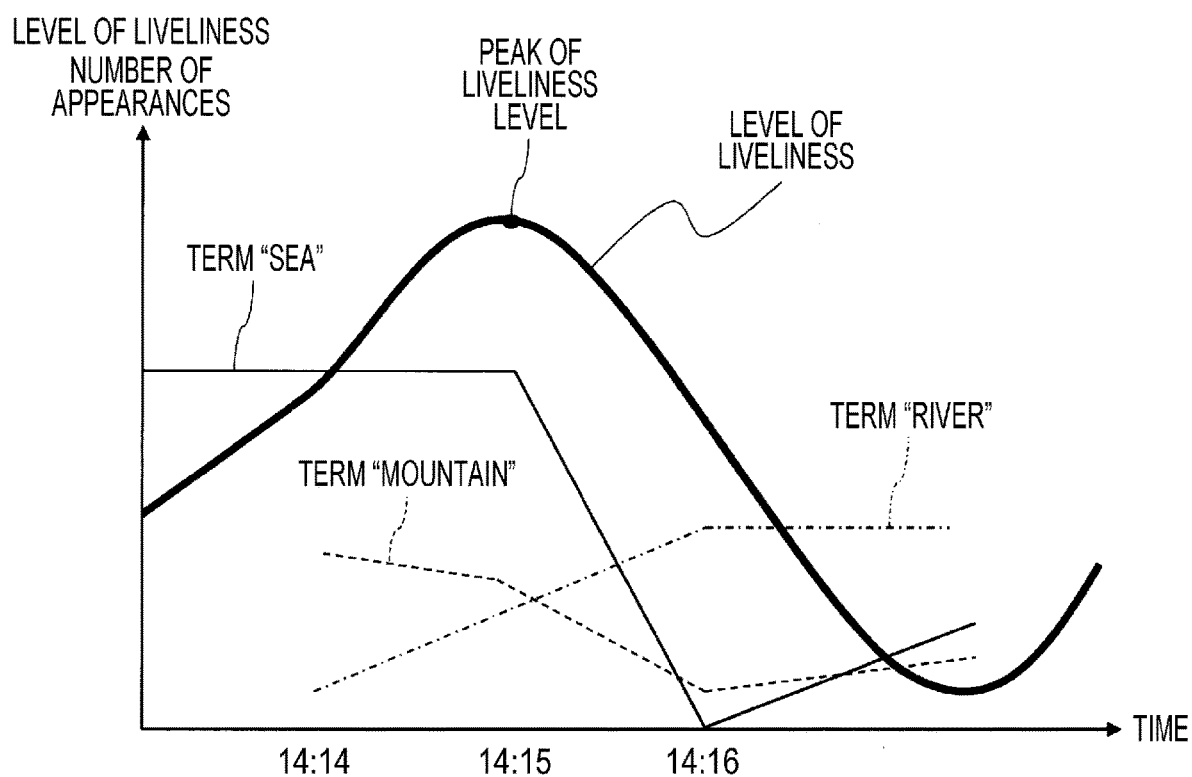
FIG. 5 is a graph illustrating an example of a temporal change in the level of liveliness and the number of appearances of each term.

FIG. 5 illustrates a graph (thick line) indicating a temporal change in the level of liveliness in the target data 14, a graph (thin solid line) indicating the number of appearances of the term "sea" every unit time, which appears in the target data 14, a graph (dashed line) indicating the number of appearances of the term "mountain" every unit time, and a graph (dashed dotted line) indicating the number of appearances of the term "river" every unit time. The graphs illustrated in FIG. 5 can be obtained based on the processing results (see FIGS. 2 and 3) of the counter 28 and the liveliness level calculation unit 30.

The output controller 32 identifies each unit time during which a local maximum (peak of the level of liveliness) of the level of liveliness is reached. Hereafter, a unit time during which a local maximum of the level of liveliness is reached is referred to as a local maximum liveliness point. In the example of FIG. 5, 1 minute after 14:15 is identified as a local maximum liveliness point. It is to be noted that multiple local maximum liveliness points are present in general, and multiple local maximum liveliness points are identified.

Subsequently, the output controller 32 lists the term having a largest number of appearances at each of the multiple local maximum liveliness points. Consequently, terms are listed the same number of times as the number of the multiple local maximum liveliness points.

For a term in the listed multiple terms, which does not overlap with other listed terms, the output controller 32 sets a partial period including a local maximum liveliness point at which the term appears most frequently, as the part of the target data 14 corresponding to the term. For instance, in the example of FIG. 5, when "sea" is the most frequently appearing term during 1 minute after 14:15 which is a local maximum liveliness point, and "sea" is not the most frequently appearing term at other local maximum liveliness points, part of the target data 14 corresponding to the term "sea" is set to 1 minute after 14:15.

For a term in the listed multiple terms, which overlaps with other listed terms, the output controller 32 sets a partial period including a local maximum liveliness point having a highest level of liveliness among multiple local maximum liveliness points at which the term appears most frequently, as the part of the target data 14 corresponding to the term.

In this manner, part of the target data 14 corresponding to each term is set. When a term expression 42 is selected by a user in the word cloud 40, the output controller 32 outputs part of the target data 14 corresponding to the term according to the term expression 42. For instance, in the example of FIG. 5, when the term expression 42 for "sea" is selected by a user, the output controller 32 outputs (reproduces) the data during 1 minute after 14:15 of the target data 14 which is video (or voice data). In this manner, the output controller 32 also serves as a target data output interface.

Thus, by selecting a term expression 42, it is possible for a user to check a local maximum liveliness point by video or voice, at which a term according to the selected term expression 42 appears most frequently in the target data 14.

Among the terms which appear in the target data 14, for a term not listed as the most frequently appearing term at any local maximum liveliness point, the unit time during which the term appears most frequently is set as the part of the target data corresponding to the term in the temporal change in the number of appearances of the term. For instance, in the example of FIG. 5, when the term "mountain" is not the most frequently appearing term at any local maximum liveliness point, if the unit time during which the term "mountain" appears most frequently is 1 minute after 14:14 in the temporal change in the number of appearances of the term "mountain", the 1 minute after 14:14 is set as the part of the target data 14 corresponding to the term "mountain". Similarly, when the term "river" is not the most frequently appearing term at any local maximum liveliness point, if the unit time during which the term "river" appears most frequently is 1 minute after 14:16 in the temporal change in the number of appearances of the term "river", the 1 minute after 14:16 is set as the part of the target data 14 corresponding to the term "river".

With the word cloud 40 described above, it is possible for a user to grasp each term which appears frequently when the level of liveliness increases in the target data 14. However, a user may desire to grasp the terms which appear frequently when the level of liveliness decreases in the target data 14. In that case, the output controller 32 identifies a unit time (a local minimum liveliness point) during which a local minimum of the level of liveliness (the valley of the level of liveliness) is reached in the graph indicating a temporal change in the level of liveliness illustrated in FIG. 5, and identifies the most frequently appearing term at the local minimum liveliness point. In addition, the output controller 32 displays the term in an identifiable display mode in the word cloud 40.

Figure 6:
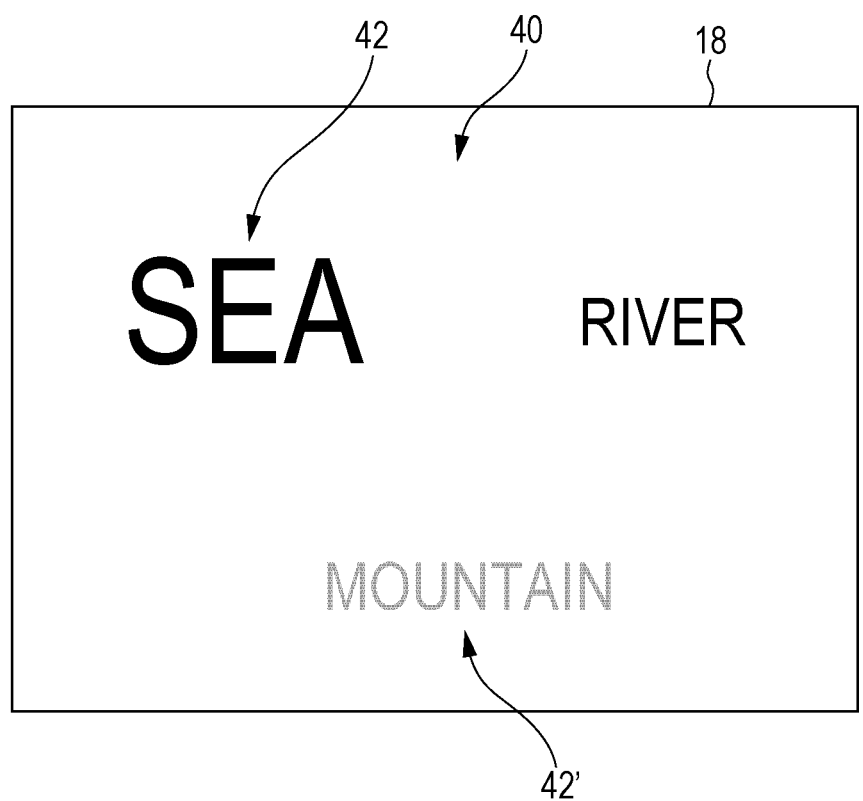
FIG. 6 is a display illustrating a second display example of word cloud according to the exemplary embodiment.

For instance, when the term "mountain" is the most frequently appearing term at the local minimum liveliness point, as illustrated in FIG. 6, a term expression 42' for "mountain" is displayed in a light color (for instance, semi-transparently). Thus, it is possible for a user to grasp that the term "mountain" is the most frequently appearing term at the local minimum liveliness point. Also, when the term expression 42' for "mountain" is selected by a user in FIG. 6, the output controller 32 may output the part of the target data 14 corresponding to the local minimum liveliness point.

From the viewpoint of simplifying the word cloud 40 by reducing the number of term expressions 42 included in the word cloud 40, the most frequently appearing term at the local minimum liveliness point may not be displayed in the word cloud 40.

Returning to FIG. 1, the comparator 34 compares multiple pieces of target data 14 regarding the terms which appear in the target data 14, the number of appearances of each of the terms, and the level of liveliness when the term appears, thereby comparing the contents of multiple pieces of target data 14. Thus, a change in the contents of multiple pieces of target data 14 is determined. For instance, when the target data 14 is meeting data, the change in the contents of multiple pieces of target data 14 is stagnation or divergence in change in the contents between multiple pieces of meeting data.

For instance, the comparator 34 can determine the change in the contents of multiple pieces of target data 14 by comparing the term expressions 42 included in multiple word clouds 40 corresponding to the multiple pieces of target data 14.

When the term expressions 42 included in multiple word clouds 40 correspond to the same term, and the display modes of the term expressions 42 are the same (in other words, the index values of the terms are the same), it can be said that the same term appears frequently when the level of liveliness increases in any of multiple pieces of target data 14 corresponding to the multiple word clouds 40. Therefore, in this case, the comparator 34 can determine that no change has been made in the contents of multiple pieces of target data 14 corresponding to the multiple word clouds 40. Conversely, when the term expressions 42 included in the word clouds 40 correspond to different terms or when the term expressions 42 displayed in the largest size in the word clouds 40 are different, it can be said that in the multiple pieces of target data 14 corresponding to the multiple word clouds 40, the terms which appear frequently when the level of liveliness increases are different. Therefore, in this case, the comparator 34 can determine that a change has been made in the contents of multiple pieces of target data 14 corresponding to the multiple word clouds 40.

A specific method of comparing the term expressions 42 is as follows.

For instance, when word clouds 40 are stored as image data such as jpg data, a first method is such that a term expression 42 in one word cloud 40 and a term expression 42 in the other word cloud 40 are compared using image comparison.

Figure 7:
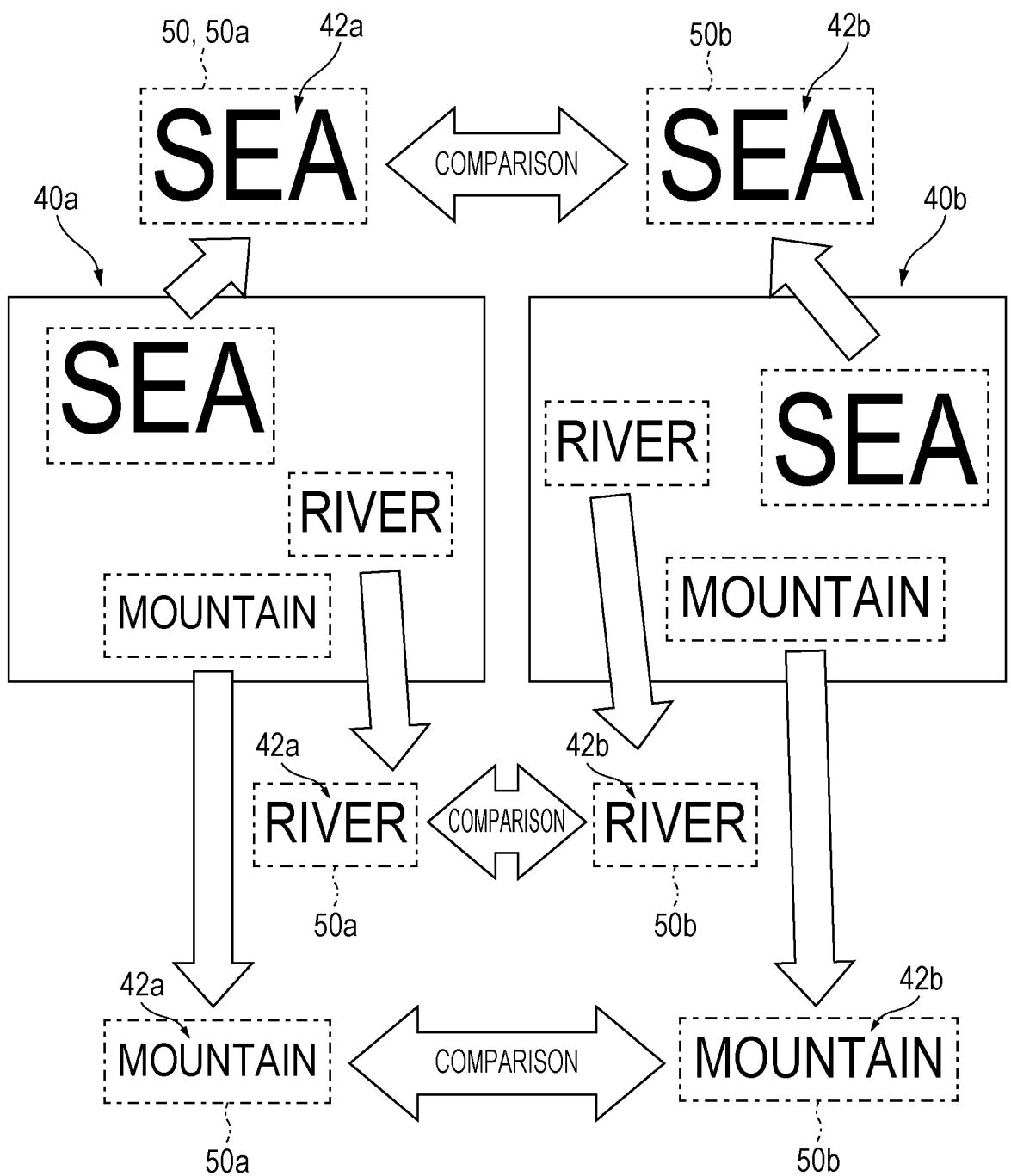
FIG. 7 is a diagram illustrating the manner in which two word clouds are compared.

FIG. 7 illustrates the manner in which term expressions 42 are compared using image comparison between multiple word clouds 40. As illustrated in FIG. 7, the comparator 34 first performs image analysis processing (for instance, OCR) on a word cloud 40a which is image data, and extracts term expressions 42a, thereby cutting out a term area 50a including the term expressions 42a. The comparator 34 may extract all term expressions 42a included in the word cloud 40a, or part of the term expressions 42a, for instance, first some term expressions 42a in descending order of size (in other words, in descending order of index value). Similarly, the comparator 34 performs image analysis processing (for instance, OCR) on a word cloud 40b which is image data, and extracts term expression 42b, thereby cutting out a term area 50b including the term expressions 42b.

Subsequently, the comparator 34 compares the term area 50a with the term area 50b. Needless to say, the comparator 34 compares term areas 50 (for instance, the term area 50a for "sea" and the term area 50b for "sea") corresponding to term expressions 42 for the same term. Specifically, the comparator 34 compares the term area 50a with the term area 50b by comparing the pixel values of the pixels of the term area 50a with the pixel values of the corresponding pixels of the term area 50b.

According to the above-mentioned image comparison method, it is possible to determine whether the term expression 42a and the term expression 42b represent the same term, and to compare the display modes of the term expression 42a and the term expression 42b. In particular, in the exemplary embodiment, each term expression 42 has a display mode according to the index value of the term, specifically, a display mode that reflects the number of appearances of the term and the level of liveliness when the term appears, and thus comparison between term expressions 42 makes it possible to determine a change in the contents between the target data 14 corresponding to the word cloud 40a and the target data 14 corresponding to the word cloud 40b in consideration of not only simply the number of appearances of each term but also the level of liveliness.

In the exemplary embodiment, since the display position of each term expression 42 in the word cloud 40 is not defined (is random), term areas 50 are cut out from the word cloud 40, then compared with each other. However, if the display position of each term expression 42 in the word cloud 40 is defined (for instance, the display position of the term expression 42 for "sea" in the word cloud 40 has been determined), it is possible to make image comparison between the word clouds 40 in its entirety without performing the cut-out processing on term areas 50.

When the word cloud 40 is stored in a data format (for instance, HTML format) having the term indicated by each term expression 42 and the display mode (for instance, the size) of each term expression 42 as numerical values, the second method is such that a term expression 42 in one word cloud 40 and a term expression 42 in the other word cloud 40 are compared based on the numerical values for the term expressions 42 included in the data format.

Referring to FIG. 7 again, when the word clouds 40a and 40b have HTML format, the comparator 34 obtains a numerical value indicating the size of the term expression 42a for "sea" from the HTML data of the word cloud 40a, obtains a numerical value indicating the size of the term expression 42b for "sea" from the HTML data of the word cloud 40b, and compares the term expressions 42 for "sea" by the difference between the obtained numerical values. Other term expressions 42 are also compared in a similar manner.

It is to be noted that the comparator 34 may compare the contents of multiple pieces of target data 14 by comparing the number of appearances of each term counted between multiple pieces of target data 14. FIG. 8 illustrates the number of appearances of each term expression 42 counted by the counter 28 in multiple pieces of target data 14a to 14c.

For instance, when the difference of the appearance ratios of each term between multiple pieces of target data 14 is lower than or equal to threshold (for instance, 5%), the comparator 34 determines that there is no change in the contents of the multiple pieces of target data 14. For instance, in FIG. 8, the appearance ratios of the terms in the target data 14a are 50% for "sea", 25% for "mountain", and 25% for "river", and the appearance ratios of the terms in the target data 14b are 53% for "sea", 21% for "mountain", and 26% for "river". Therefore, the difference of the appearance ratios of each term is lower than or equal to 5%, and thus the comparator 34 determines that there is no change in the contents between the target data 14a and 14b.

For instance, when some terms among the top (for instance, the first to third) in the number of appearances are the same in multiple pieces of target data 14, the comparator 34 may determine that there is a possibility of no change in the contents of the multiple pieces of target data 14. For instance, in FIG. 8, in the target data 14a to 14c, the terms in the first to third in the number of appearances are "sea", "mountain", and "river". Therefore, the comparator 34 determines that there is a possibility of no change in the contents of the target data 14a to 14c.

The comparator 34 may regard multiple terms having a degree of similarity of meaning higher than or equal to a predetermined threshold as a single term collectively, and may compare the number of appearances of each term between multiple pieces of target data 14.

The comparator 34 may determine a change in the contents of multiple pieces of target data 14 based on comparison between the term which appears most frequently at a maximum liveliness point at which the level of liveliness reaches a maximum in first target data 14, and the multiple terms which appear most frequently at multiple local maximum liveliness points in second target data 14.

Figure 9A:
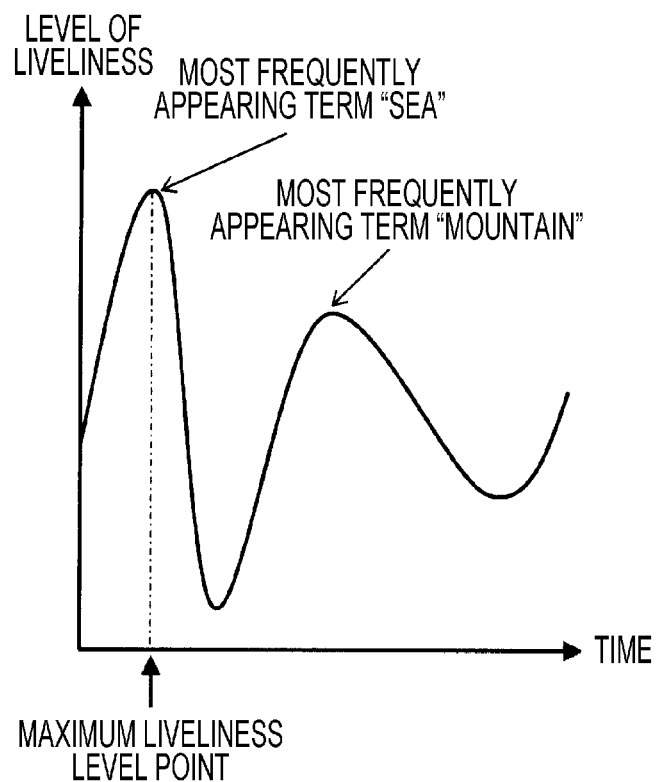
FIGS. 9A and 9B are first graphs illustrating the terms which appear most frequently at local maximum liveliness points in two pieces of target data.
Figure 9B:
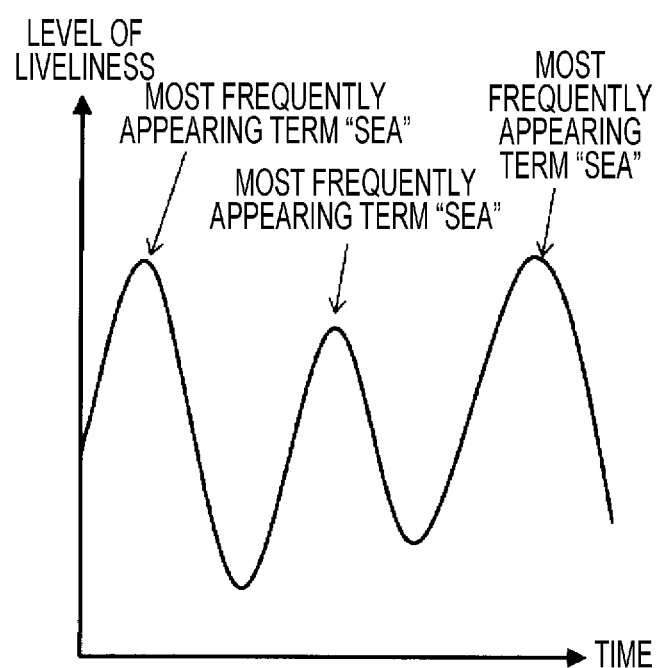
Figure 10A:
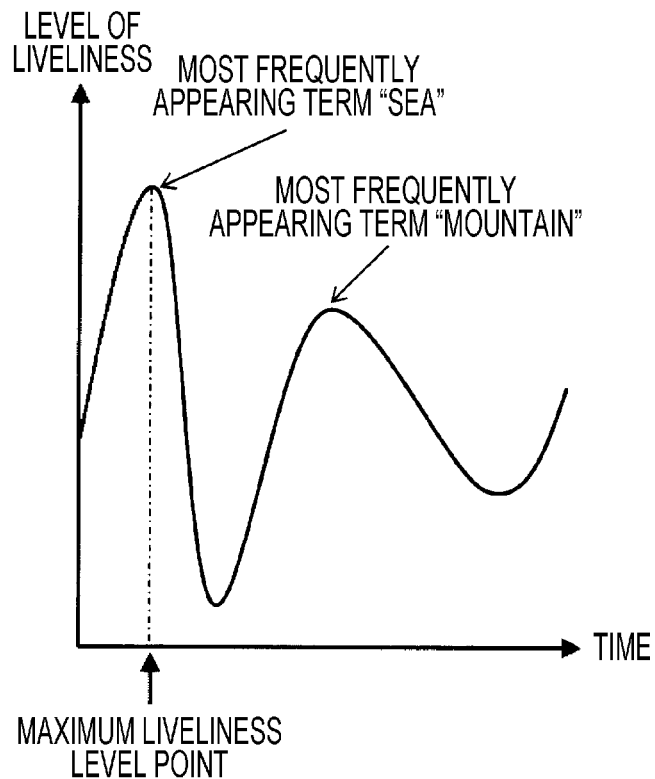
FIGS. 10A and 10B are second graphs illustrating the terms which appear most frequently at local maximum liveliness points in two pieces of target data.
Figure 10B:
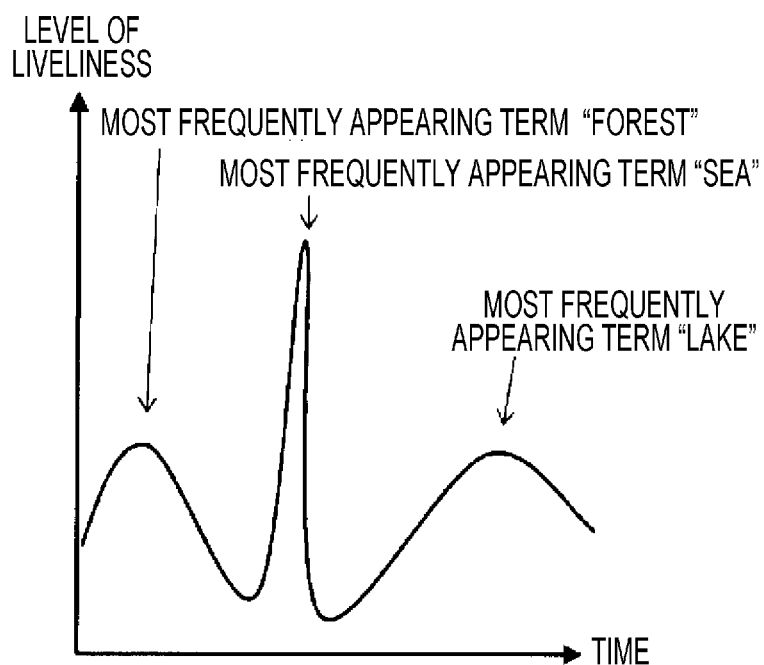
Figure 11A:
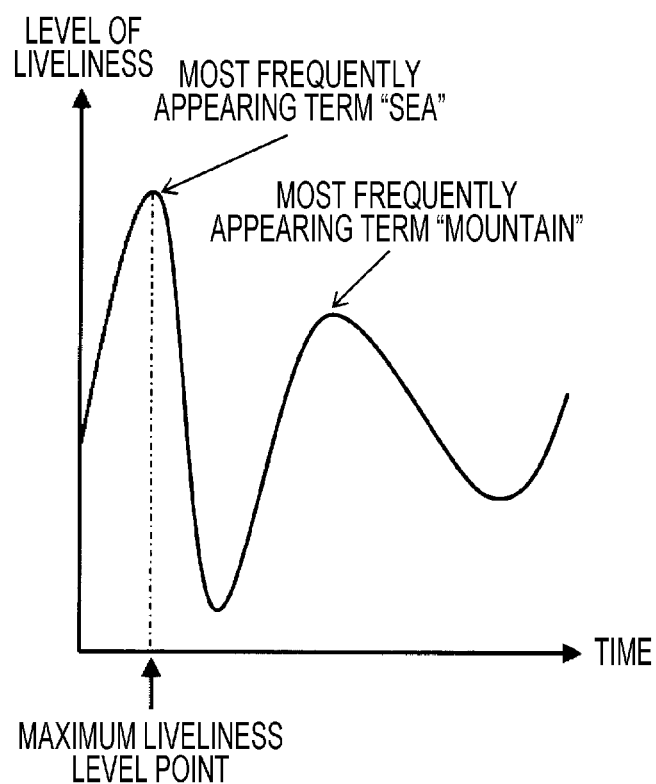
FIGS. 11A and 11B are third graphs illustrating the terms which appear most frequently at local maximum liveliness points in two pieces of target data.
Figure 11B:
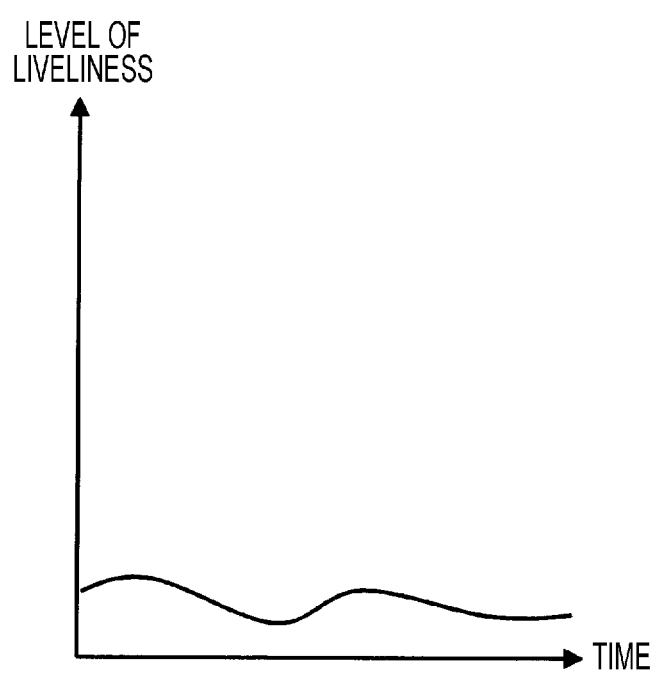

FIG. 9A, FIG. 10A, and FIG. 11A each illustrate a graph indicating a temporal change in the level of liveliness of first meeting data as the first target data 14, and FIG. 9B, FIG. 10B, and FIG. 11B each illustrate a graph indicating a temporal change in the level of liveliness of second meeting data as the second target data 14.

In the example of FIG. 9, the term which appears most frequently at the maximum liveliness point in the first meeting data is "sea", and the terms which appear most frequently at multiple local maximum liveliness points in the second meeting data are each "sea".

In such a situation, it is conceivable that discussion on the subject of "sea", which is a priority term in the first meeting, is ongoing in the second meeting, and thus the comparator 34 can determine that no stagnation has occurred in change in the contents between the first and second meeting.

In the example of FIG. 10, the term which appears most frequently at the maximum liveliness point in the first meeting data is "sea", and there is a variation in the terms which appear most frequently at multiple local maximum liveliness points in the second meeting data.

In such a situation, it is conceivable that although "sea" is a priority term in the first meeting, another topic is discussed in the second meeting, in other words, discussion on the original topic has not progressed, and thus the comparator 34 can determine that stagnation has occurred in change in the contents between the first and second meeting. Also, in this case, the comparator 34 may determine that divergence has occurred in change in the contents between the first and second meeting. Particularly, when the term ("sea" in this example) which appears most frequently at the maximum liveliness point in the first meeting data is the same as the term which appears most frequently at the maximum liveliness point in the second meeting data, it is conceivable that the same liveliness in the first meeting continues in the second meeting, and discussion on the original topic has not progressed.

As illustrated in FIG. 11, when the level of liveliness at the maximum liveliness point in the second meeting is lower than or equal to a threshold, it is conceivable that the second meeting is far from lively, and thus the comparator 34 can determine that stagnation has occurred in change in the contents between the first and second meeting.

Also, the comparator 34 may determine a change in the contents of multiple pieces of target data 14 in further consideration of the terms which appear most frequently at local maximum liveliness points other than the maximum liveliness point in the first target data.

For instance, in the example of FIG. 9, when the term which appears most frequently at the maximum liveliness point is "sea", and the term which appears most frequently at local maximum liveliness points other than the maximum liveliness point is a term other than "sea" ("mountain" in FIG. 9) in the first meeting data, it is conceivable that after various topics including "sea" and "mountain" are discussed in the first meeting, discussion about "sea", which is particularly priority topic among the topics, has progressed in the second meeting. Therefore, in this case, the comparator 34 can determine that no stagnation has occurred in change in the contents between the first and second meeting.

On the other hand, if the term which appears most frequently at local maximum liveliness points other than the maximum liveliness point is "sea" in the example of FIG. 9, it is conceivable that discussion about "sea" is ongoing in the first meeting as well as the second meeting. Therefore, the comparator 34 can determine that stagnation has occurred in change in the contents between the first and second meeting.

Also, in the example of FIG. 10, when the term which appears most frequently at the maximum liveliness point is "sea", and the term which appears most frequently at local maximum liveliness points other than the maximum liveliness point is a term other than "sea" ("mountain" in FIG. 10) in the first meeting data, it is conceivable that although various topics including "sea" and "mountain" have been discussed in the first meeting, various topics are still discussed in the second meeting. Therefore, the comparator 34 can determine that stagnation has occurred in change in the contents between the first and second meeting. Also, in this case, the comparator 34 may determine that divergence has occurred in change in the contents between the first and second meeting.

On the other hand, if the term which appears most frequently at local maximum liveliness points other than the maximum liveliness point is "sea" in the example of FIG. 10, it is conceivable that discussion about "sea" has been made sufficiently in the first meeting, and another new subject has been discussed in the second meeting. Therefore, in this case, the comparator 34 can determine that no stagnation has occurred in change in the contents between the first and second meeting. Also, in this case, the comparator 34 may determine that divergence has occurred in change in the contents between the first and second meeting.

As the method of comparing multiple pieces of target data 14 by the comparator 24, two methods have been described in the above: the method of comparing term expressions 42 included in the word cloud 40, and the method of comparing the terms which appear most frequently at local maximum liveliness points including the maximum liveliness point. The comparator 34 may separately perform or sequentially perform the two methods. For instance, a possibility of stagnation in change in the contents of multiple pieces of meeting data is determined by the method of comparing term expressions 42, then stagnation in change in the contents of the meeting data may be confirmed by the method of comparing the terms which appear most frequently at local maximum liveliness points.

The target data 14 to be compared by the comparator 34 may be designated by a user at will. For instance, two pieces of target data 14 may be compared, or three or more pieces of target data may be compared. Alternatively, certain target data 14 may be compared with accumulation of other pieces of target data 14. When comparison with the accumulation is made, each of the accumulated other pieces of target data 14 may be weighted first.

In particular, when the target data 14 is meeting data, and a user says something like "I feel like the same topic was discussed in the past, but I don't remember", comparison may be made between the first meeting data and the fourth meeting data, the second meeting data and the fourth meeting data, and the third meeting data and the fourth meeting data.

Also, comparison between any pieces of meeting data may be useful for users. For instance, comparison of the fourth meeting data with the first meeting data allows the degree of progress of the entire meeting to be checked. Also, when the subject is different between the third meeting and the fourth meeting, the subject is the same between the second meeting and the fourth meeting, the meeting data may be compared between the second meeting and the fourth meeting.

Furthermore, the comparator 34 may compare data in real time during a meeting. The target data for comparison in this case may be those data during a certain unit time and another unit time in the target data 14, or data during multiple collective unit times may be compared. For instance, of the target data 14, the data from the start of a meeting to 10 minutes after the start, and the data from 10 minutes after the start to 20 minutes after the start may be compared.

The notifier 36 notifies a user of a change in the contents between multiple pieces of target data 14 based on the comparison between the multiple pieces of target data 14 made by the comparator 34. For instance, the notifier 36 notifies a user of no change or a change in the contents between multiple pieces of target data 14 compared by the comparator 34.

In particular, since the target data 14 is meeting data in the exemplary embodiment, when the comparator 34 determines that stagnation has occurred in change in the contents of multiple pieces of meeting data, the notifier 36 outputs a warning to a user. When receiving a warning, a user may take measures for leading a meeting in a favorable manner, such as changing the method of leading the meeting. Also, when the comparator 34 compares data in real time during a meeting, it is possible for a user to recognize stagnation in change in the contents of the meeting and to take measures for leading the meeting in a favorable manner during the meeting.

Also, in some meetings, it is desired that ideas be converged in a direction. Assuming such a situation, when the comparator 34 determines that divergence has occurred in change in the contents of multiple pieces of meeting data, warning may be issued to a user.

Whether the notifier 36 issues warning to a user at the occurrence of stagnation or divergence in change in the contents of multiple pieces of meeting data may be set by a user at will. Consequently, a user receives an appropriate warning according to the contents of a meeting.

Also, when prohibited terms are defined in advance, the notifier 36 may issue warning to a user if one of the prohibited terms appears in the target data 14.

Various methods may be devised as the method of outputting a notification by the notifier 36. For instance, the notifier 36 may output notification as voice from the sound output 22. For instance, voice such as "it seems that a meeting has not progressed" is outputted. Needless to say, the contents of voice to be outputted may be set by a user at will.

Figure 12A:
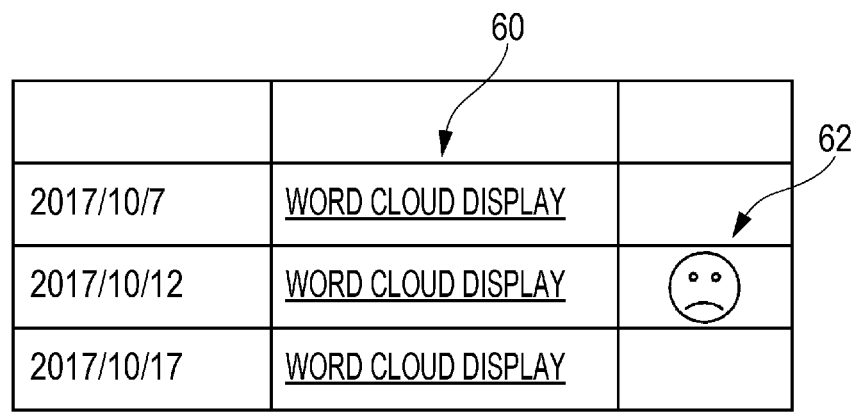
FIGS. 12A and 12B are a table and a display illustrating display examples of warning.

Also, the notifier 36 may display a notification on the display 20. Although various display modes may be used as the display mode of a notification, for instance, as illustrated in FIG. 12A, when a link 60 for opening multiple word clouds 40 corresponding to multiple pieces of target data 14 is displayed as a list, a warning icon 62 may be displayed corresponding to the link 60. In the example of FIG. 12, the warning icon 62 is attached to the meeting data on Oct. 12, 2017, and this indicates that stagnation has occurred in the contents of the meeting data on Oct. 12, 2017, as compared with the meeting data on Oct. 7, 2017.

Figure 12B:
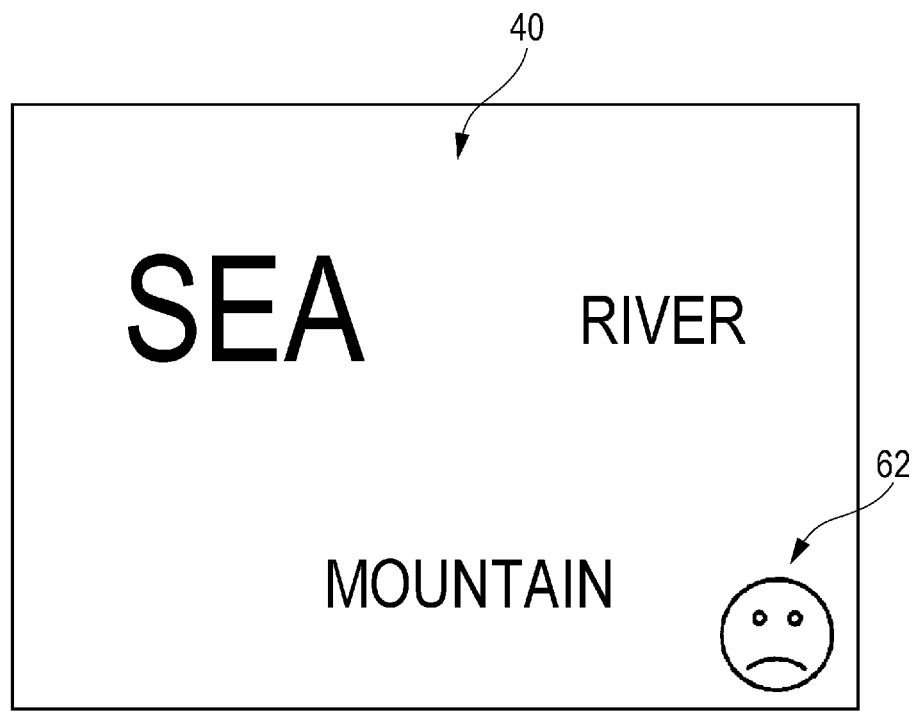

Alternatively, as illustrated in FIG. 12B, the warning icon 62 may be displayed along with the word cloud 40. This is particularly effective when the word cloud 40 is generated and displayed in real time during a meeting.

The method of outputting a notification by the notifier 36 may be set by a user at will.

Although the exemplary embodiment according to the invention has been described above, the invention is not limited to the exemplary embodiment, and various modifications may be made without departing from the spirit of the invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a controller programmed to:
receive target data including audio data and image data, a term being included in the target data;
determine a level of liveliness of the target data at a time when the term appears, based on a first parameter derived from facial expressions in the image data, and a second parameter derived from volume data in the audio data;
control a display to display a term expression indicating the term; and
control the display to change a form of the displayed term expression, based on the determined level of liveliness.

2. The information processing device according to claim 1,
wherein among a plurality of terms each of which is the term which appears in the target data, multiple terms having a degree of similarity in meaning higher than or equal to a threshold are collectively regarded as a single term.

3. The information processing device according to claim 1, wherein the controller controls the display to further display the term expression in a display mode based on a number of appearances of the term which appears in the target data.

4. The information processing device according to claim 2, wherein the controller controls the display to further display the term expression in a display mode based on a number of appearances of the term which appears in the target data.

5. The information processing device according to claim 3, wherein the controller is programmed to, when the term expression for the term which appears most frequently at a local maximum liveliness point is selected by a user, output part of the target data including the local maximum liveliness point at which the level of liveliness reaches a local maximum in the target data.

6. The information processing device according to claim 4, wherein the controller is programmed to, when the term expression for the term which appears most frequently at a local maximum liveliness point is selected by a user, output part of the target data including the local maximum liveliness point at which the level of liveliness reaches a local maximum in the target data.

7. The information processing device according to claim 5, wherein the controller is programmed to control the display to display the term expression for the term which appears most frequently at a local minimum liveliness point in an identifiable display mode, the local minimum liveliness point being a point at which the level of liveliness reaches a local minimum in the target data.

8. The information processing device according to claim 3, wherein the controller is programmed to include a notifier that notifies a user of a change in contents between a plurality of pieces of target data each of which is the target data based on comparison between the plurality of pieces of target data related to the term which appears in the target data, the number of appearances of the term, and the level of liveliness of the target data when the term appears.

9. The information processing device according to claim 8, wherein the notifier notifies a user of the change in the contents between the plurality of pieces of target data based on comparison between a plurality of term expressions corresponding to the plurality of pieces of target data, the plurality of term expressions each including the term expression.

10. The information processing device according to claim 8, wherein the notifier notifies a user of a change in contents between first target data and second target data based on comparison between the term which appears most frequently at a maximum liveliness point at which the level of liveliness reaches a maximum in the first target data, and a plurality of terms which appear most frequently at a plurality of local maximum liveliness points at which the level of liveliness reaches a local maximum in the second target data.

11. The information processing device according to claim 10, wherein the notifier further notifies a user of the change in the contents between the first target data and the second target data based on the plurality of terms which appear most frequently at the plurality of local maximum liveliness points other than the maximum liveliness point in the first target data.

12. The information processing device according to claim 8, wherein the target data is meeting data indicating contents of a meeting, and the notifier that, when a change in contents between a plurality of pieces of meeting data each of which is the meeting data stagnates or diverges, notifies a user of a warning.

13. A non-transitory computer readable medium storing an information processing program causing a computer to execute a process comprising:

receiving target data including at least one of audio data and image data, a term being included in the target data;

determining a level of liveliness of the target data at a time when the term appears, based on a first parameter derived from facial expressions in the image data, and a second parameter derived from volume data in the audio data;

controlling a display to display a term expression indicating the term; and controlling the display to change a form of the displayed term expression, based on the determined level of liveliness.

* * * * *